(12) United States Patent
Davis et al.

(10) Patent No.: US 11,658,725 B2
(45) Date of Patent: May 23, 2023

(54) SYSTEM AND METHOD FOR RADAR DISAMBIGUATION TECHNIQUES

(71) Applicant: Fortern Technologies, Inc., Pleasant grove, UT (US)

(72) Inventors: Bryan Alan Davis, Salt Lake City, UT (US); Matthew Robertson Morin, Provo, UT (US); Nathan James Packard, Provo, UT (US)

(73) Assignee: Fortem Technologies, Inc., Pleasant Grove, UT (US)

( * ) Notice: Subject to any disclaimer, the term of this patent is extended or adjusted under 35 U.S.C. 154(b) by 0 days.

(21) Appl. No.: 17/397,187

(22) Filed: Aug. 9, 2021

(65) Prior Publication Data
US 2021/0367658 A1    Nov. 25, 2021

Related U.S. Application Data

(63) Continuation of application No. 16/589,654, filed on Oct. 1, 2019, now Pat. No. 11,088,753.

(60) Provisional application No. 62/739,646, filed on Oct. 1, 2018, provisional application No. 62/788,353, filed on Jan. 4, 2019.

(51) Int. Cl.
| | |
|---|---|
| *H04M 1/00* | (2006.01) |
| *H04B 7/08* | (2006.01) |
| *H04B 7/0456* | (2017.01) |
| *H01Q 21/06* | (2006.01) |
| *H01Q 1/52* | (2006.01) |
| *H01Q 1/22* | (2006.01) |

(52) U.S. Cl.
CPC .......... *H04B 7/086* (2013.01); *H01Q 1/2258* (2013.01); *H01Q 1/523* (2013.01); *H01Q 21/065* (2013.01); *H04B 7/0486* (2013.01)

(58) Field of Classification Search
CPC .... H04B 7/086; H04B 7/0486; H01Q 1/2258; H01Q 1/523; H01Q 21/065
USPC ....................................... 455/562.1
See application file for complete search history.

(56) References Cited

U.S. PATENT DOCUMENTS

| 7,031,754 B2 * | 4/2006 | Scherzer | ............... H04W 16/00 455/562.1 |
| 7,069,050 B2 * | 6/2006 | Yoshida | ............... H04B 7/0697 375/267 |

(Continued)

FOREIGN PATENT DOCUMENTS

WO    WO 2015/169366 A1    11/2015

*Primary Examiner* — April G Gonzales

(57) ABSTRACT

A system having an array of antennas with particular weights for signals associated with different groups of antennas. The array of antennas includes a first group of antennas positioned in a middle portion of the array of antennas, a second group of antennas positions at one or more edges of the array of antennas, and a third group of antennas positioned at one or more corners of the array of antennas. The system includes a control module configured to control each respective and tenant in the array of antennas. The control module can further be configured to weight the first group of antennas a first weighting amount, to weight the second group of antennas a second weighting amount and to weight the third group of antennas a third weighting amount. The weighting improves the system's ability to reduce ambiguities in an angle of arrival associated with the object.

20 Claims, 12 Drawing Sheets

(56) References Cited

U.S. PATENT DOCUMENTS

| | | | | |
|---|---|---|---|---|
| 7,289,834 B2* | 10/2007 | Sun | ............... | H04L 27/2647 |
| | | | | 455/562.1 |
| 7,457,590 B2* | 11/2008 | Frank | ............... | H04W 52/42 |
| | | | | 455/67.11 |
| 7,554,944 B2* | 6/2009 | Garmonov | ............... | H04B 1/7097 |
| | | | | 455/562.1 |
| 7,953,065 B2* | 5/2011 | Lysejko | ............... | H04B 7/0695 |
| | | | | 455/562.1 |
| 8,098,189 B1* | 1/2012 | Woodell | ............... | G01S 7/025 |
| | | | | 342/26 B |
| 8,310,947 B2* | 11/2012 | Hwang | ............... | H04W 48/02 |
| | | | | 342/368 |
| 8,423,028 B2* | 4/2013 | Kenington | ............... | H01Q 3/26 |
| | | | | 455/445 |
| 8,660,483 B2* | 2/2014 | Tsuchida | ............... | H01Q 3/24 |
| | | | | 455/562.1 |
| 8,731,616 B2* | 5/2014 | Kenington | ............... | H01Q 1/246 |
| | | | | 455/67.14 |
| 2004/0110538 A1* | 6/2004 | Doi | ............... | H01Q 3/2605 |
| | | | | 455/562.1 |
| 2005/0085269 A1* | 4/2005 | Buljore | ............... | H04L 25/03343 |
| | | | | 455/562.1 |
| 2006/0199615 A1* | 9/2006 | Jin | ............... | H01Q 1/246 |
| | | | | 455/562.1 |
| 2008/0004078 A1* | 1/2008 | Barratt | ............... | H04W 52/42 |
| | | | | 455/562.1 |
| 2008/0102898 A1* | 5/2008 | Na | ............... | H04B 7/0634 |
| | | | | 455/562.1 |
| 2014/0313081 A1* | 10/2014 | Tan | ............... | H01Q 3/00 |
| | | | | 342/368 |

* cited by examiner

SYSTEM AND METHOD FOR RADAR DISAMBIGUATION TECHNIQUES

PRIORITY

The present application is a continuation of U.S. patent application Ser. No. 16/589,654, filed Oct. 1, 2019, which claims priority to U.S. Provisional Application No. 62/739,646, filed Oct. 1, 2018, and U.S. Provisional Application No. 62/788,353, filed Jan. 4, 2019, the contents of which are herein incorporated by reference in their entireties.

TECHNICAL FIELD

The present disclosure relates to radar identification techniques through the use of a multi-channel array design and applied weighting in a particular pattern in the array to produce data that reduces or eliminates ambiguity with respect to the angle of arrival of a received signal.

BACKGROUND

Although radar technology has long existed, the radio signals produced through radar technology can vary in terms of clarity and completeness. The use of multiple antennas can magnify the range of radar imagery, however, it adds to the problems associated with signal ambiguity. System having an antenna array often use an equal weighting associated with each element in the array. In this scenario, a problem can arise where there is no unique answer with respect to an angle of arrival of a signal from the target object. A targeted object may appear in the data as coming from a number of indeterminable radar angles. Identifying the true angle of arrival and thus the actual location of the object can be difficult. The number of different angles in the data occurs because a first side lobe of the received signal, a main lobe, and a second side lobe can each have a respective angle of arrival. Therefore, there could be multiple answers regarding where the target object actually is which can be confusing or impossible to disambiguate.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
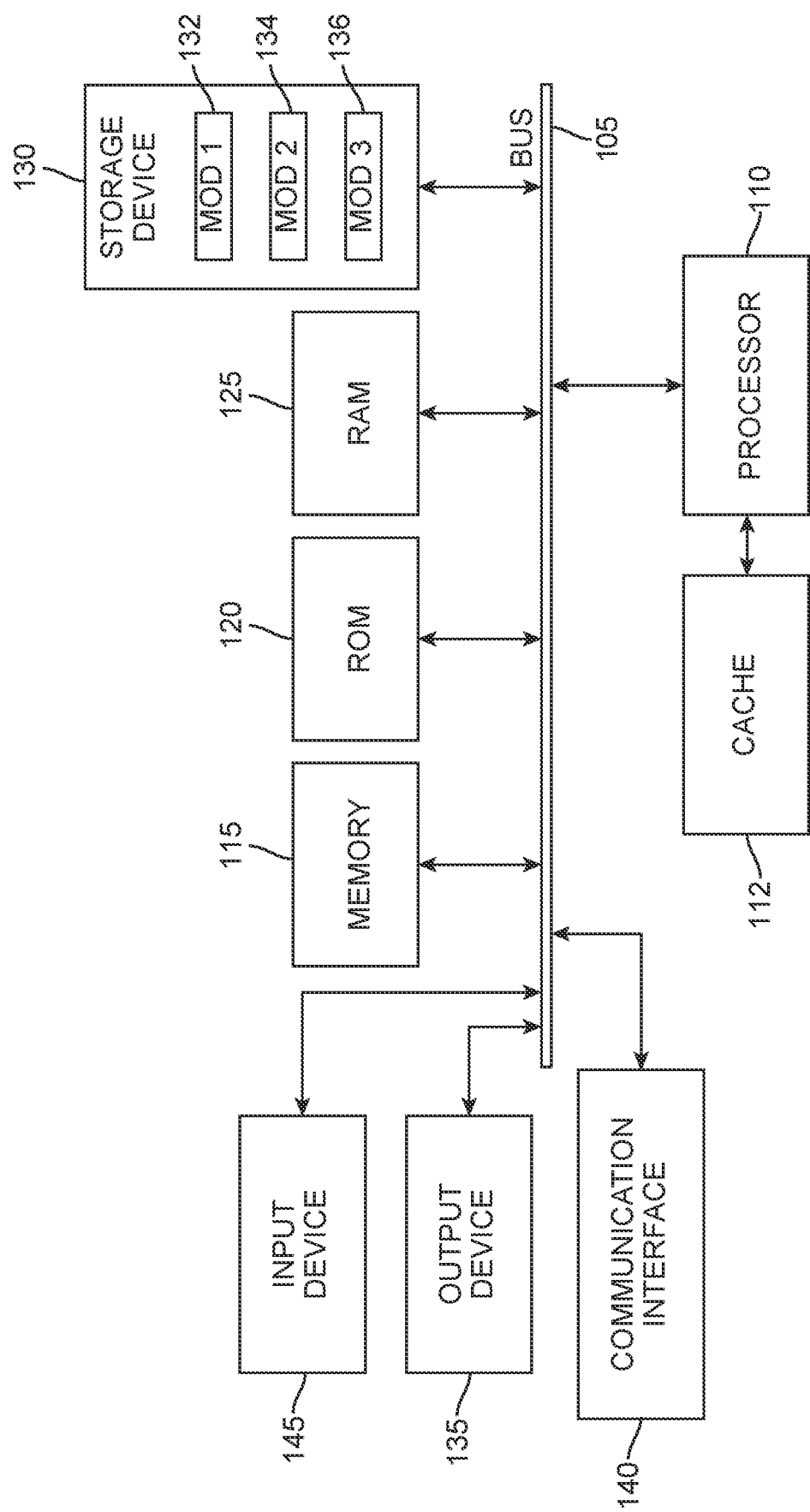
FIG. 1 illustrates an example system configuration.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present disclosure introduces technology which reduces or eliminates the possibility of having multiple objects identified in signals returned from a radar transmission. A radar system implementing the techniques disclosed herein can produce a unique angle related to a target relative to an antenna array. Weighting the elements in an antenna array according to a certain pattern can cause, in the analysis of the channel phase difference of a received signal from the target object, the signal indicating an angle of arrival that is associated with respective side lobes of the received signal to be shifted such that only a single signal associated with the main lobe can be used to identify the angle of arrival. By effectively eliminating the side lobe signals, the system can disambiguate what the angle of arrival is for the target object.

Disclosed is system and method of implementing an array of antennas having particular weights for signals associated different groups of antennas. An example system includes an array of antennas, the array of antennas including a first group of antennas positioned in a middle portion of the array of antennas, a second group of antennas positions at one or more edges of the array of antennas, and a third group of antennas positioned at one or more corners of the array of antennas. The system includes a control module (optional) configured to control each respective and tenant in the array of antennas. In one aspect, no control module is used, and each element is constructed with its respective weight to cause the disambiguation approach disclosed herein. The control module, or the antenna elements, can be further configured to define a first channel and can include at least a first antenna and a second antenna. The first antenna and the second antenna can each be in different groups of antennas in the array of antennas. The control module, or the antenna elements, can further be configured to weight the first group of antennas a first amount, to weight the second group of antennas a second amount and to weight the third group of antennas a third amount. In one aspect, the first weighting amount is greater than the second weighting amount, and the second weighting amount is greater than the third weighting amount.

In one aspect, the first group of antennas includes between 1 and 5 antennas, wherein the second group of antennas includes between 1 and 5 antennas and wherein the third group of antennas includes between 1 and 4 antennas. The array can be configured in a square shape, a rectangular shape, a circular shape or an oval shape. Generally the shapes are symmetrical but other, even asymmetrical shapes, are considered.

An example method can include operating an array of antennas. The array of antennas can include a first group of antennas positioned in a middle portion of the array of antennas, a second group of antennas positions at one or more edges of the array of antennas, and a third group of antennas positioned at one or more corners of the array of antennas. The method includes defining a first channel of at least a first antenna and a second antenna, wherein the first antenna and the second antenna are each in different groups of antennas in the array of antennas. The method can also include weighting a first group of signals associated with the first group of antennas a first weighting amount, weighting a second group of signals associated with the second group of antennas a second weighting amount and weighting a third group of signals associated with the third group of antennas a third weighting amount. The first amount is greater than the second amount, which is greater than the third amount.

The weighting of the antenna elements as described herein causes a channel phase difference versus angle of arrival of the signal received from a target object to only have a single available angle of arrival associated with the main lobe signal. The side lobe signals, which would indicate alternate angles of arrival in an unweighted scenario, disappear in a certain range of data, and thus eliminate the possibility of an ambiguous angle of arrival for the signal.

DETAILED DESCRIPTION

The present disclosure addresses the issues raised above. The disclosure provides a system, method and computer-readable storage device embodiments.

First a general example system shall be disclosed in FIG. 1, which can provide some basic hardware components making up a server, node or other computer system. FIG. 1 illustrates a computing system architecture 100 wherein the components of the system are in electrical communication with each other using a connector 105. Exemplary system 100 includes a processing unit (CPU or processor) 110 and a system connector 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules/services can control or be configured to control the processor 110 to perform various actions. Other system memory 115 may be available for use as well. The memory 115 can include multiple different types of memory with different The processor 110 can include any general purpose processor and a hardware module or software module/service, such as service 1 132, service 2 134, and service 3 136 stored in storage device 130, configured to control the processor 110 as well as a special-purpose processor where software instructions are incorporated into the actual processor design. The processor 110 may be a self-contained computing system, for example, containing multiple cores or processors, a bus (connector), memory controller, cache, etc. A multi-core processor may be symmetric or asymmetric.

To enable user interaction with the computing device 100, an input device 145 can represent a variety of input mechanisms, such as a microphone for speech, a touch-sensitive screen for gesture or graphical input, a keyboard and/or mouse, e.g., for motion input and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and/or hybrids thereof.

The storage device 130 can include software services 132, 134, 136 for controlling the processor 110. Other hardware or software modules/services are contemplated. The storage device 130 can be connected to the system connector 105. In one aspect, a hardware module that performs a particular function can include the software component stored in a computer-readable medium in connection with the necessary hardware components, such as the processor 110, connector 105, display 135, and so forth, to carry out the function.

One of the common problems with antenna theory results when a replica of a transmitted image is offset from the actual position. Ambiguities exist when unweighted antenna arrays transmit a radar signal, which is reflected off a target object. In some detection systems, signals related to a main lobe of the signal as well as side lobes of the signal can cause a detection system to identify multiple different angles of arrival for that signal. One angle of arrival can be associated with the main lobe, and other angles of arrival can be associated with respective side lobes. This can be confusing and indeterminate with respect to the angle of arrival of the signal and thus cause confusion with respect to the actual location of the object. Typically, antenna designers seek to implement a better antenna or cable system to mitigate the impact of ambiguities. As disclosed herein, the novel approach involves weighting signals at individual antennas in a particular way which can impact the signals associated with each channel in a particular way. This shall be described in more detail below.

Figure 2A:
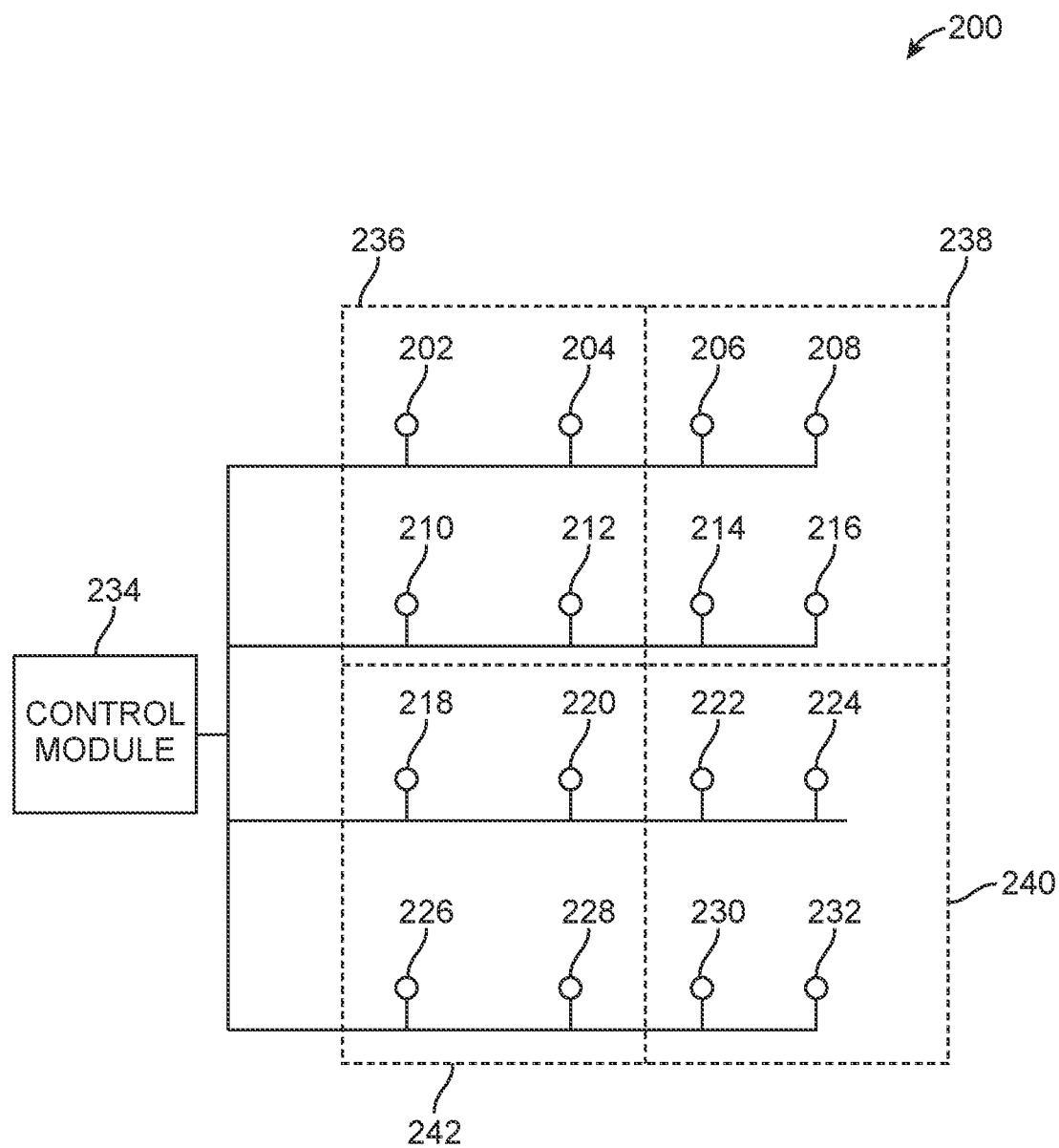
FIG. 2A illustrates an example array of antennas.

FIG. 2A illustrates a basic array of antennas as disclosed herein. Disclosed is system and method of implementing an array of antennas 200 having particular weights for signals associated with different groups of antennas. A set of antennas 202, 204, 206, 208, 210, 212, 214, 216, 218, 220, 222, 224, 226, 228, 230, and 232 can include antennas of various specifications and types. The array of antennas can include a first group of antennas positioned in a middle portion of the array of antennas. The first group of antennas, by way of example, can include one or more of antennas 212, 214, 220, 222. A second group of antennas can be positioned at one or more edges of the array of antennas. For example, the second group of antennas can include one or more of antennas 204, 206, 216, 224, 228, 230, 210 and 218. A third group of antennas can be positioned at one or more corners of the array of antennas. An example of the third group of antennas can include any one or more of antennas 202, 208, 232 and 226. Each antenna and the array of antennas 200 can communicate with a control module 234.

An example antenna is used herein and can include a patch antenna, which is a type of radio antenna having a low profile, in which it can be mounted on a flat surface. A patch antenna consists of a flat rectangular sheet or patch of metal mounted over a larger sheet of metal called a ground plane. The two metal sheets together form a resonant piece of microstrip transmission line with a length approximately one half of the wavelength of the radio waves. The radiation mechanism arises from discontinuities at each truncated edge of the microstrip transmission line. The radiation at the edges causes the antenna to act slightly larger electrically than its physical dimensions. In order for the antenna to be resonant, a length of microstrip transmission line slightly shorter than one-half a wavelength at the frequency is used.

In one example, multiple patch antennas can be configured on a same substrate, and can be called microstrip antennas. These can be used to make high gain array antennas and phased arrays in which the beam can be electronically steered. The particular structure of the antenna can be varied in this disclosure. However, a preferred antenna type is the patch antenna as an array of patch antennas can be used in various contexts such as on a drone which can be deployed to identify objects in airspace. The principles disclosed herein can apply to any type of antennas such as a bow-tie antenna, a dipole array, a monopole antenna, a loop antenna, a helical antenna, yagi-uda antenna, a planar inverted-F antenna, a rectangular microstrip antenna, a corner reflector, a parabolic reflector, and so forth A control module may be used to control the weighting of the antennas. The control module 234 can be configured to control each respective antenna in the array of antennas 200. The control module 234 can be further configured to define a first channel to include at least a first antenna and a second antenna. The first antenna and the second antenna can each be in different groups of antennas in the array of antennas. For example, the first channel can be defined by the signals transmitted and/or received by antennas 206 and 214. In this regard, signal 214 could be considered within the first group of interior antennas and antenna 206 can be an edge antenna. The channel may also be defined by more than 2 antennas. For example, a first channel 236 can be defined by the signals transmitted and/or received by antennas 202, 204, 210, and 212. Similarly, a second channel 238 could be defined by the signals transmitted and/or received from one or more of antennas 206, 208, 214, and 216. A third channel 240 can be defined by one or more of the antennas 222, 224, 230 and 232. A fourth channel 242 could be defined by one or more of the signals transmitted and/or received from antennas 218, 220, 226 and 228. Indeed, a channel can be defined in the context of this disclosure by any one or more antennas in the array of antennas. It also is not a requirement that antennas used to define a channel are contiguous. However, in a preferred aspect of this disclosure, where more than one antenna is utilized to define a channel, the weighting of the more than one antenna will differ so as to result in the improved signal processing that is described herein. By weighting the antennas in the particular positions as described herein, the resulting signal processing improves the ability of the system to identify objects and avoid ambiguity issues.

As noted above, in one aspect, no control module is needed for weighting because the physical structure of the antennas in the antenna array can be configured to build into the antenna the desired weighting. Both approaches can apply.

The control module, or the structure of the antennas, can further be configured to weight the first group of antennas a first weighting amount, to weight the second group of antennas a second weighting amount and to weight the third group of antennas a third weighting amount. In one aspect, the first weighting amount is greater than the second weighting amount, and the second weighting amount is greater than the third weighting amount. An example weighting can include a first weighing amount between −1 and 1 dB, a second weighting amount between −6 and −4 dB, and a third weighting amount between −9 and −11 dB. In an example scenario, the antennas within this defined first channel can include antenna 214 with the first weighting amount and antenna 206 with the second weighting amount. For example, antenna 214 can be weighted at 0 dB and antenna 206 can be weighted at around −5 dB. Where the second channel 238 is defined by antennas 206, 208, 214 and 216, example weighting for that channel can be antenna 214 at 0 dB, antennas 206, 216 at approximately −5 dB and a third antenna 208 at −10 dB. A similar structure can also be implemented for the third channel 240 by having antenna 222 weighted at 0 dB, antennas 224, 230 weighted at −5 dB and antenna 232 weighted at −10 dB. Any identification of the waiting amount is approximate and can vary up or down at least several dB. All of the weightings disclosed herein are by way of example and any range can be implemented, including in an inverse order of magnitude from what is described herein.

In one aspect, the first group of antennas includes between 1 and 5 antennas, wherein the second group of antennas includes between 1 and 5 antennas and wherein the third group of antennas includes between 1 and 4 antennas. In one aspect, the array of radar antennas includes MxN antennas, where M can be between 3 and 7 and N can also be between 3 and 7. In one example array, M=4 and N=4. The array can be configured into various shapes, a few examples of which will be described below. On a 5×5 sized array, for example, one could have five different weighting schemes.

Figure 2B:
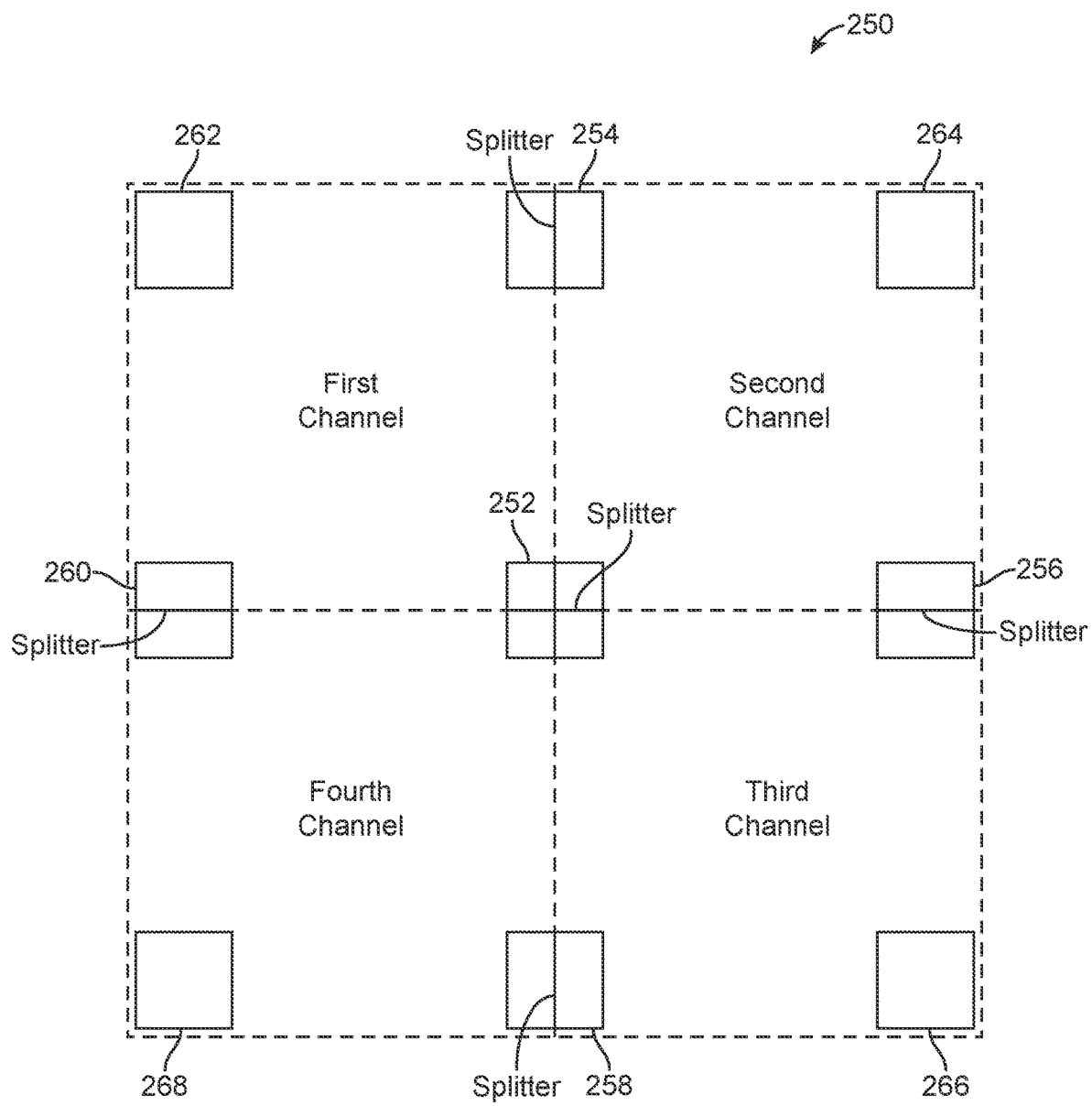
FIG. 2B illustrates an example 3×3 array of antennas.

The combination of elements or antennas in the array that define an individual channel can depend on the number of elements and/or the configuration. For example, where a 3×3 element array 250 is used as is shown in FIG. 2B, a center element 252 might have a splitter associated with it, such that its signal is communicated to 4 individual channels as shown. Edge elements 254, 256, 258, 260 can include splitters the split each respective signal in half as shown. In this manner, a 9 element array can produce four channels for signal processing. A first channel can be defined by elements 262, 254 (cut in half), 252 (cut in a fourth), and 260 (cut in half). A second channel can be defined by elements 264, 256 (cut in half), 252 (cut in a fourth), in 254 (cut in half). A third channel can be defined by elements 266, 258 (cut in half), 252 (cut in a fourth), and 256 (cut in half). Finally, a fourth channel can be defined by elements 268, 260 (cut in half), 252 (cut in a fourth), and 258 (cut in half). The weighting associated with these elements can include, for example, a 0 dB weight on element 252, a −5 dB weight on elements 254, 256, 258 and 260 and a −10 dB weight on elements 262, 264, 266, 268.

The fact that splitters are involved in splitting signals from elements to define the respective channels can impact the weight for any respective channel. For example, the weighting of the signal from element 252 may be impacted with respect to each channel given that the signal is split by the splitter. For example, a 0 dB element 252, split into 4 different signals, my, cause a channel defined by elements 252, 254, 250, 256 to view the signal from element 252 as having a −6 dB weight. However, after signal processing, the values can be added back together to address this issue. In one aspect, using splitters is shown in FIG. 2B maintains a symmetric nature of each respective channel relative to the physical configuration of elements in the array.

The process of disambiguation can use these various channels as described herein. For example, signals from the respective channels that are in phase or out of phase can impact whether those signals are representative of signals from a main lobe or a side lobe of the received signal. FIGS. 9A-9D illustrate the relationship between the gain versus angle of arrival of a signal received from a target object and a channel phase difference versus the angle of arrival with respect to the main lobe or side lobes. The presentations in the various antenna configurations help to identify and understand how various channels are defined by groups of elements in different antenna configurations, how those elements are weighted (either through a control module or the construction of each element), and how the comparison of phases between the different channels with respect to angle of arrival of a received signal from the target object can be utilized to determine or disambiguate the angle of arrival. Different antenna array configurations can provide varying constructs for defining different channels and can produce varying results with respect to a channel phase difference utilizing weighted elements. However, the general idea that represents the innovation disclosed herein involves weighting the different elements so as to enable an identification of a single angle of arrival in a received signal that can be confirmed as being associated with the main lobe of the received signal because the possible side lobe components would be eliminated by virtue of the weighting of the elements. Again, this feature will become more clear with the description of FIGS. 9A-9D below.

Figure 3:
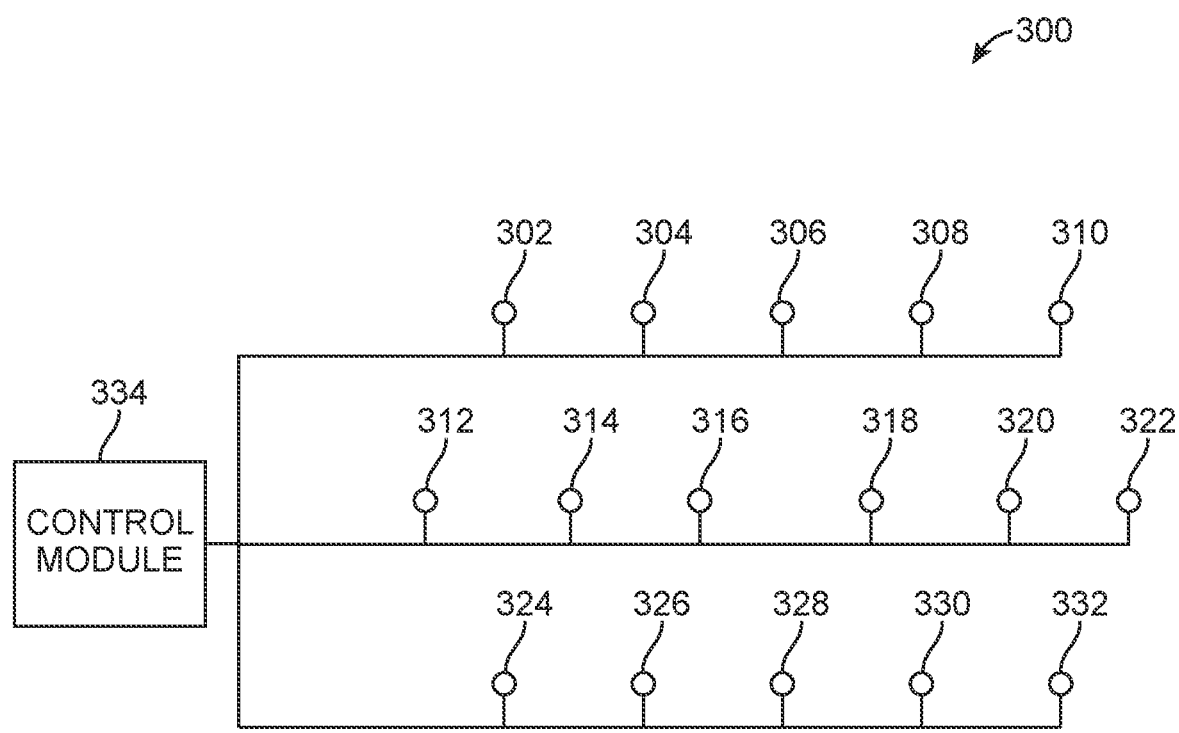
FIG. 3 illustrates an alternate array configuration of antennas.

FIG. 3 illustrates antennas 300, which are configured with the first row of antennas 302, 304, 306, 308 and 310, a second row of antennas 312, 314, 316, 318, 320 and 322 and a third row of antennas 324, 326, 328, 330 and 332. Each antenna communicates with a control module 334, when a control module is used. In this regard, central antennas can be weighted with a first amount as described herein. The central antennas could be one or more of antennas 314, 316, 318, 320. Edge antennas could include one or more of antennas 304, 306, 308, 326, 328, 330, 312, 322. These could be assigned a separate weight as described herein. A third group of corner antennas can include one or more of antenna 302, 310, 312, 322, 324 and 332. Any two or more of the antennas in the array 300 can be combined to define a respective channel.

Figure 4:
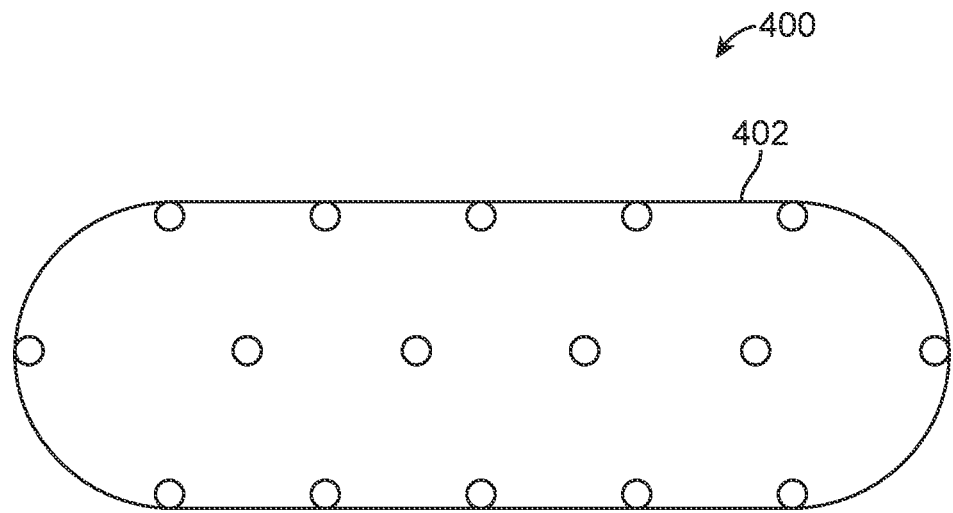
FIG. 4 illustrates a shape of an array configuration of antennas.
Figure 5:
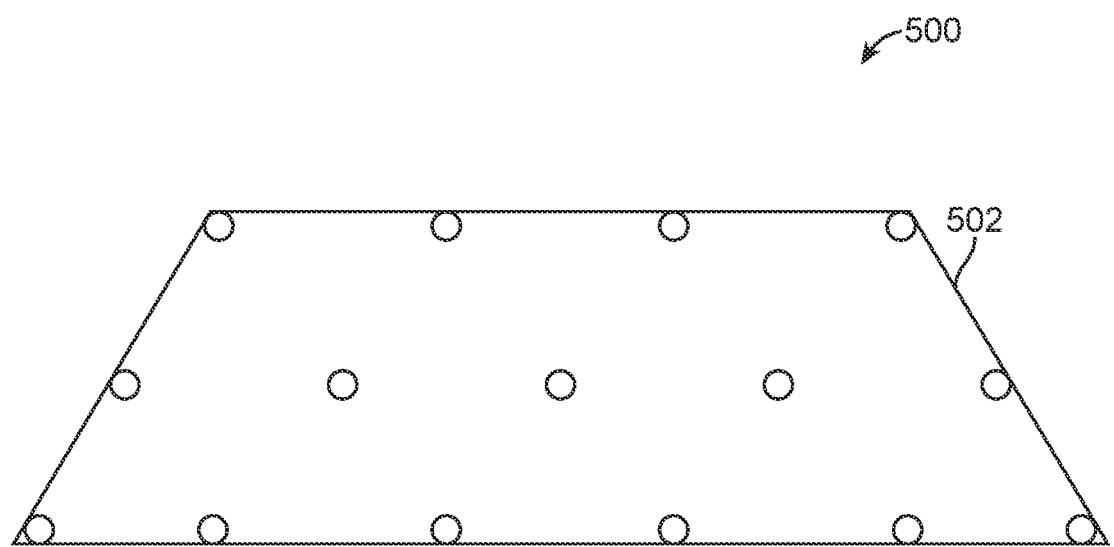
FIG. 5 illustrates an alternate shape of an array configuration of antennas.

FIG. 4 shows an outlined perimeter 402 around the array of antennas 400 to depict that the resulting shape is that of an oval. Other shapes, such as a square shape, a rectangular shape, a circular shape, and so forth, can be considered as well. Both symmetric and asymmetric shapes are included within this disclosure. FIG. 5 shows an antenna array 500 with a trapezoidal shaped perimeter 502 emphasizing that the shapes of an antenna array can include non-symmetric as well as symmetric structures.

It is preferable that the two or more antennas that are confined to define a channel would have different weights. In one example, where three or more antennas are combined to define a channel, there can be at least three different weights respectively applied to each separate antenna. Furthermore, it is contemplated that the antennas may be divided into two different weight groups or more than three weights amongst the antennas. For example, fine-tuning could occur in which four, five, six or more weights are distributed amongst interior, edge and corner antennas. It is generally contemplated that higher dB values are assigned to interior antennas, midrange dB values are assigned to edge antennas and lower range values are assigned to corner antennas. However, the inverse may be applied as well.

Figure 6:
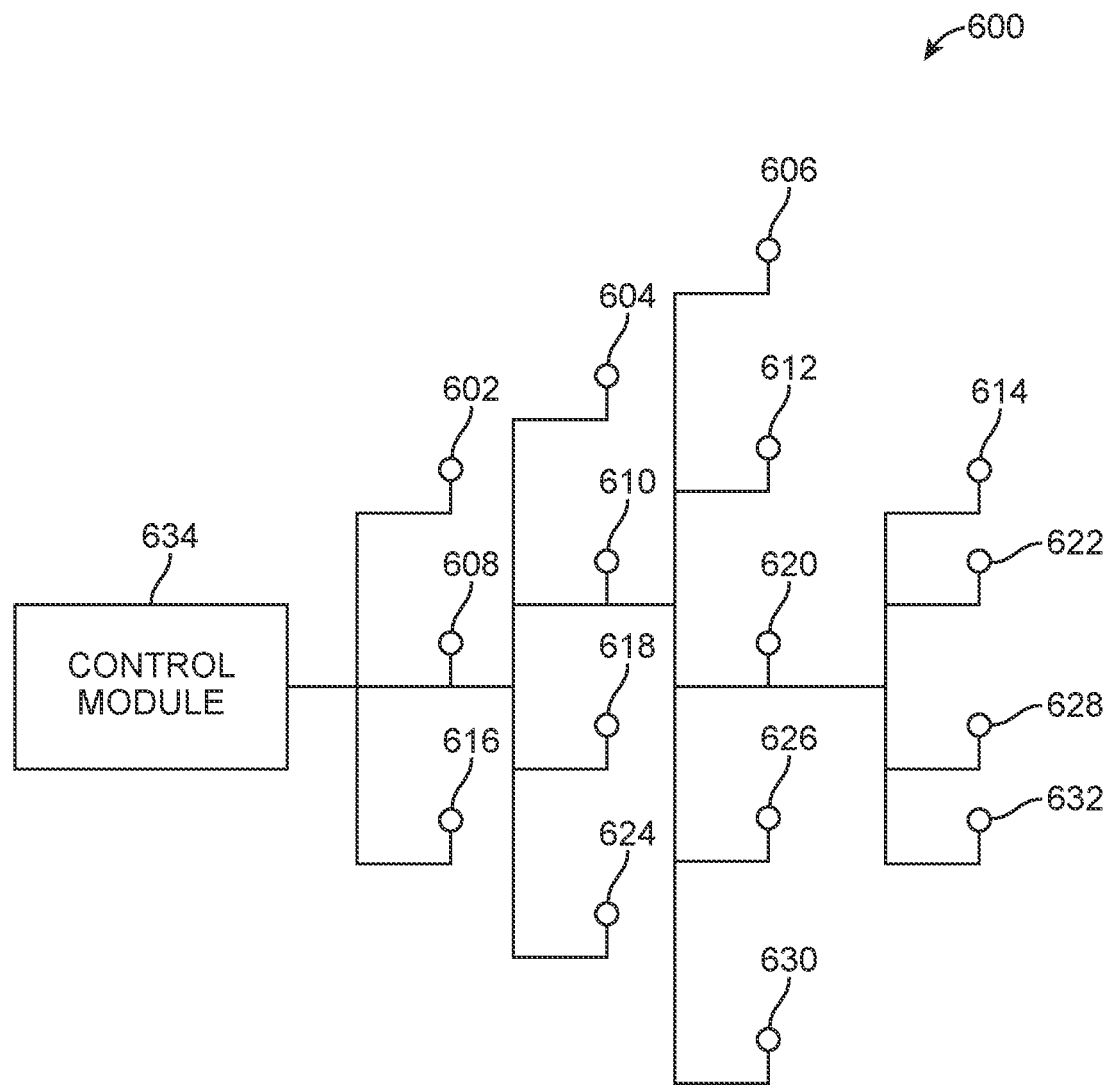
FIG. 6 illustrates an alternate array configuration of antennas.
Figure 7:
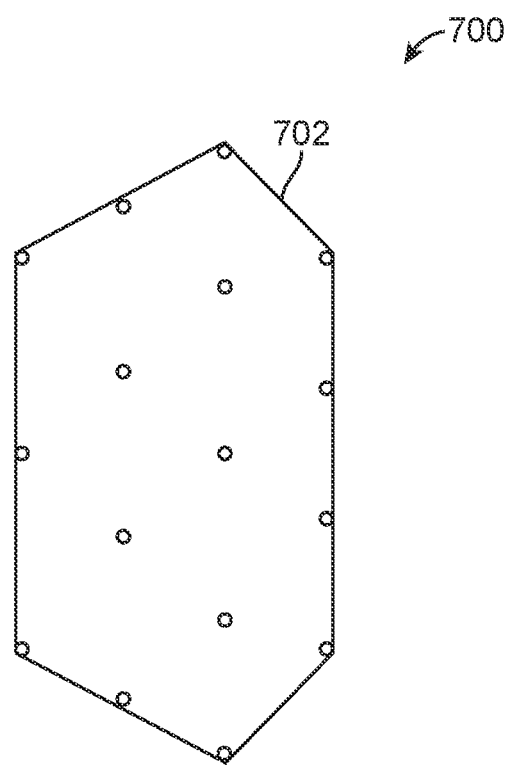
FIG. 7 illustrates an alternate shape of an array configuration of antennas.

The array of radar antennas in the overall shape of the array can include between 12 and 18 antennas in at least 4 rows. The array of radar antennas can include a first row having three antennas, a second row having four antennas, a third row having five antennas, and a fourth row having four antennas. For example, FIG. 6 illustrates an array 600 including antennas 602, 604, 606, 608, 610, 612, 614, 616, 618, 620, 622, 624, 626, 628, 630 and 632. Each antenna can indicate with a control module 634. The antenna array 600 is set on its side in the sense in this figure. If one were to view the antenna in a more horizontal fashion, a first row of antennas could be defined by antennas 602, 608, and 616. A second row of antennas can include antennas 604, 610, 618 and 624. A third row of antennas can include antennas 606, 612, 620, 626, and 630. A bottom row of antennas can include antennas 614, 622, 628, and 632. The spacing and configuration of the antennas defines a certain shape which is hexagonal in nature, but more complicated. FIG. 7 illustrates the antenna array 700 outlined with a perimeter 702 which gives a more clear definition of the hexagonal shape.

Again, in this scenario, the concepts disclosed herein involve weighting signals associated with different groups of antennas that define different channels. For example, a first weight in the array 600 can be assigned to interior antennas 610, 612, 618, 620 and 626. A second group of antennas can be assigned the second weight. In this example, the second group can include one or more of antennas 604, 622, 628, 624, and 608. A third group can include one or more of antennas 602, 606, 614, 632, 630 and 616. Higher weights can be assigned to the first group, midrange weighting can be assigned to the second group and lower range weighting can be assigned to the third group.

The groups described herein are just example configurations and any combination of weighting can be applied to any shape of an antenna array. Any two or more different weighting schemes can be applied. In one scenario, a first channel can be defined by antennas 602, 604, 608 and 610. In this scenario, antenna 610 can be assigned approximately a weight of 0 dB, antennas 604 and 608 can be assigned a midrange weight of −5 dB and corner antenna 602 can be assigned a low range weight of −10 dB.

The weighting assignments, of course, can vary and are not meant to be exact dB amounts. For example, the first amount can include between −2 and 2 dB, the second amount can be between −8 and −2 dB and the third amount can be between −7 and −13 dB. The weighting could be expanded too, for example, the first amount can be between −5 and 5 dB, the second amount can be between −10 and 10 dB and the third amount can be between −20 and 20 dB. Other ranges are contemplated as well.

In one example, an array of radars can be deployed on a building or on a mobile device such as a drone. The unit can be defined well with two or more antenna arrays used for identifying objects. When an object is identified in the field of view of these radar arrays, the control module or other processing technology can stitch together the various signals from the separate antennas and identify a single object. This is a difficult process. One challenge is identifying the angle of arrival of an incoming signal which, if identified, enables the system to identify a latitude and longitude for the object as well as how far the object is above the ground. This type of information can prove to be highly valuable.

Having 4 antennas alone in a row or as part of an array results in ambiguity at different angles. The system may not know if a target is from one angle or another. By applying a weighting across the plurality of antennas, a phase vs. angle response is created. The phase is the difference between the two antennas and a non-uniqueness result. The non-uniqueness result can occur with any two antennas within the array.

As mentioned, in order to improve the signal pattern, a weighting function can be used. Weighting of the radar signal can occur in the transmission of the signal, the receiving of the signal or both the transmission and receiving of the signal, but typically occurs during the receiving of the signal. Various weighting methods can be employed and options include a Hamming weighting, Blackmann weighting, a Taylor weighting, and so forth.

In some instances, a weighting function can change the distribution of the amplitude and phase of a signal that is received, namely the beam width and the level of the side lobes. Usually decreasing the beam width is accompanied by increasing the side lobes level. For example, a low beam width and a low level of side lobes are usually two contradictory requests for any antenna array. If one decreases, the other increases, so a balance between the two has to be made for each specific application.

Figure 8:
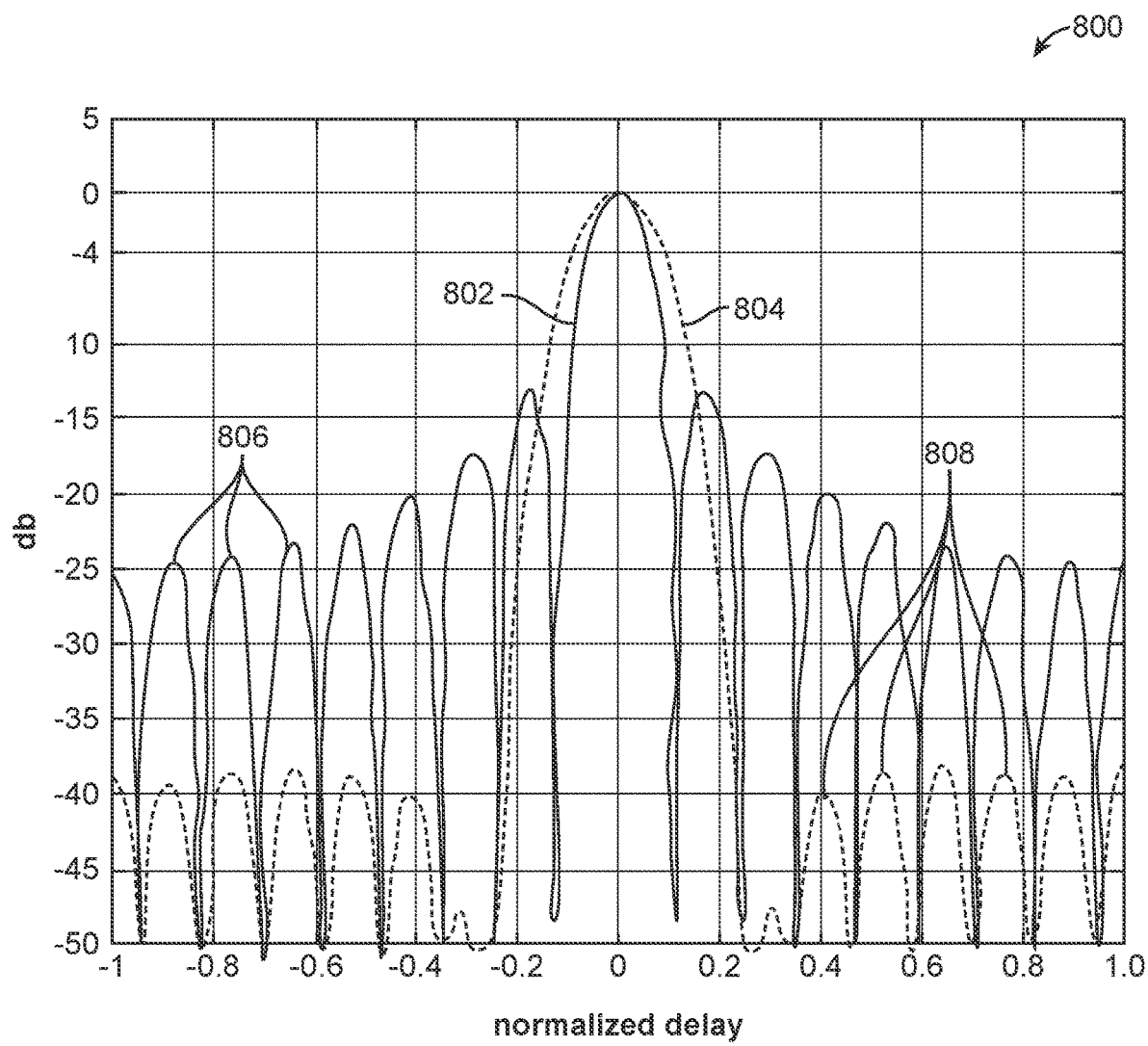
FIG. 8 illustrates an example weighting effect.

FIG. 8 shows a weighting effect on a generic signal. A generic weighting comparison graph 800 shows an unweighted signal represented by a solid line 802, and a weighted signal represented by a dashed line 804. The unweighted signal 802 includes unweighted peak side lobe levels 806 that are larger dB when compare to the peak side lobe levels of the weighted signal 808. However, the weighted signal 804 also shows that the main lobe width is larger than the main lobe width of the unweighted signal 802, which results in a degraded resolution of the weighted signal 804. Ideally, a preferred weighting is realized when reducing the level of the side lobes is achieved with a minimal sacrifice to the signal's resolution.

In one aspect, the weighting of signals can be described as a weak weighting or a strong weighting. For example, a weak weighting can be −10 dB or −5 dB and strong weighting can be 0 dB. The patch antennas respectively combine and form a channel, as defined herein, and the target in the field of view will produce a received signal. The system can perform signal processing and use a phase difference between the two signals to identify where the target is. Typically, this disclosure includes the concept of including a weak weighting and a strong weighting within each channel.

FIG. 2 shows a full array of 4×4 patch antennas, horizontally and vertically. The weighting approach disclosed herein reduces the amount of ambiguity. Ambiguities can result in both a horizontal direction and in the vertical direction. In one example, there can be 4 channels and a weighting in each direction. The middle antennas are weighted the strongest and the weighting of antennas tapers to the outside of the array.

Part of the reason why the weighting approach disclosed herein is successful is because by weighting the antennas, the system moves the phase centers closer together which results in a phase difference. The phase difference between the two channels is the relationship between the left and the right side. The slope of the phase changes in the center and the nature of a fast Fourier transform (FFT) window reduce the side lobes. The difference of the two channels is can result in having one channel that dominates. The two side lobes are going to look high, but will be out of phase. The channels will have high side lobes, but because their amplitudes are so different, they cancel each other out and the total array results in a phase that is no longer linear wrapping. This process applies the theory of windowing and tapering in the spatial domain and reduces the side lobes. A mathematical fact is that the difference between the two halves is going to have high side lobes and cause the phase to be out of phase. The resulting sum is low because they are out of phase.

The antenna arrays disclosed herein are steerable, but the results are the same whether you are steering in foresight or off axis. The phase and side lobe relationship is consistent. Without the taper, the system would have a linear phase response that wraps and probably starts from the middle and goes to the edges. This is the ambiguity problem where in constant phase it is impossible to determine the angle or phase. By tapering the high regions that are out of phase, the +180 and −180° slightly weaken the slope and the phase centers are closer together. When it wraps it tends to smooth out and stay closer to 180° which is where the out of phase comes from. The degree that it works is dependent on the weighting that is used. More weighting is better, but the system results in some disadvantages such as the slope decreasing and some extra gain. The preferred weighting is in the range of 4-6 dB, but the weighting choice can depend on one or more parameters such as the application, an accuracy of the manufacturing irregularities and a desire to maximize the gain or high angle accuracy. For example, the system can sacrifice some high angle and gain by increasing the weighting, which results in more robustness against irregularities like external effects or manufacturing tolerances. Increasing the weighting also increases the field of view.

Figure 9A:
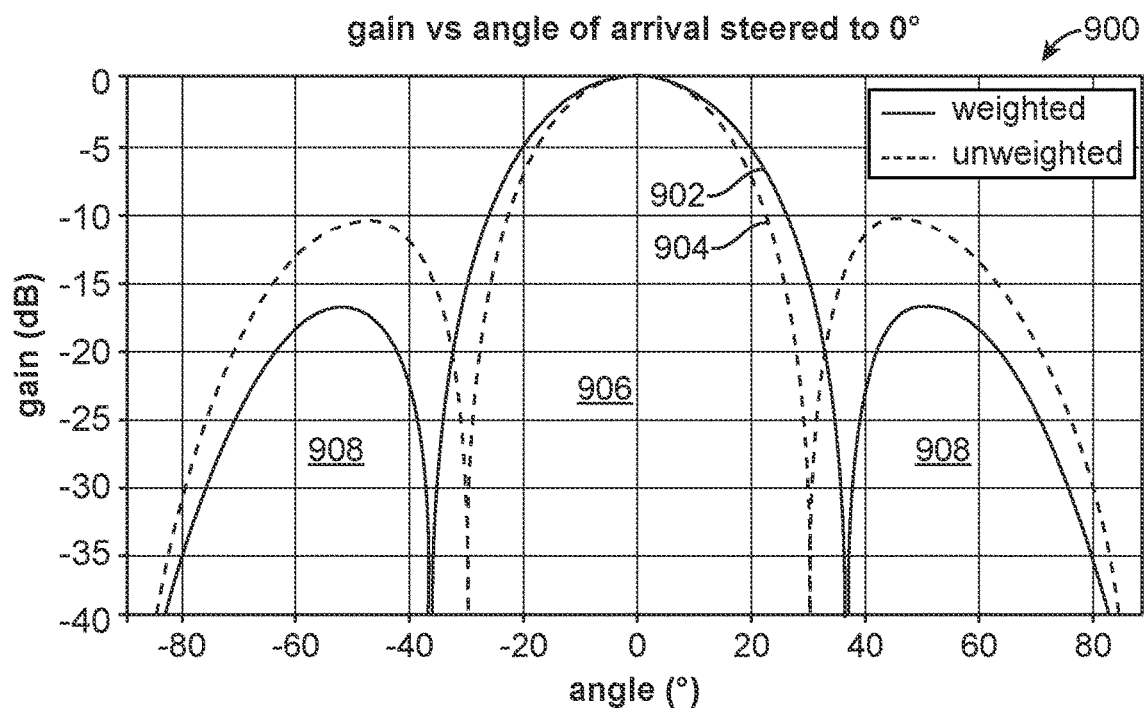
FIG. 9A illustrates gain versus angle of arrival for weighted and unweighted signals.
Figure 9B:
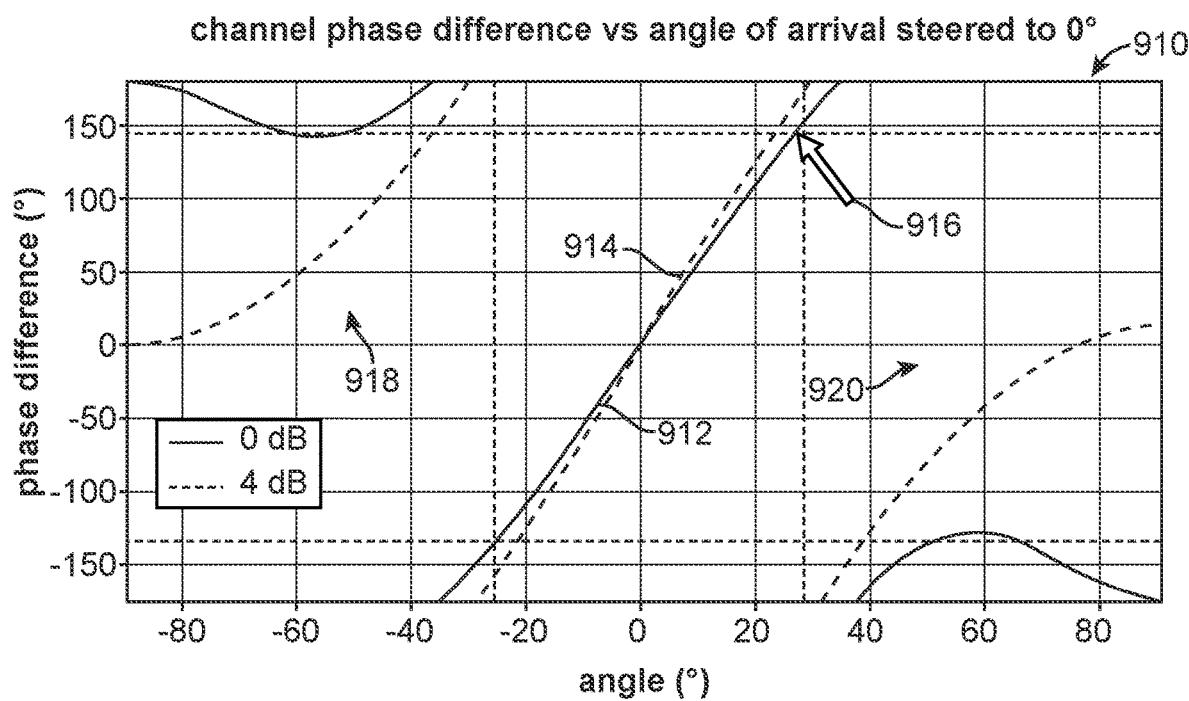
FIG. 9B illustrates a channel phase difference versus angle of arrival for weighted and unweighted signals.
Figure 9C:
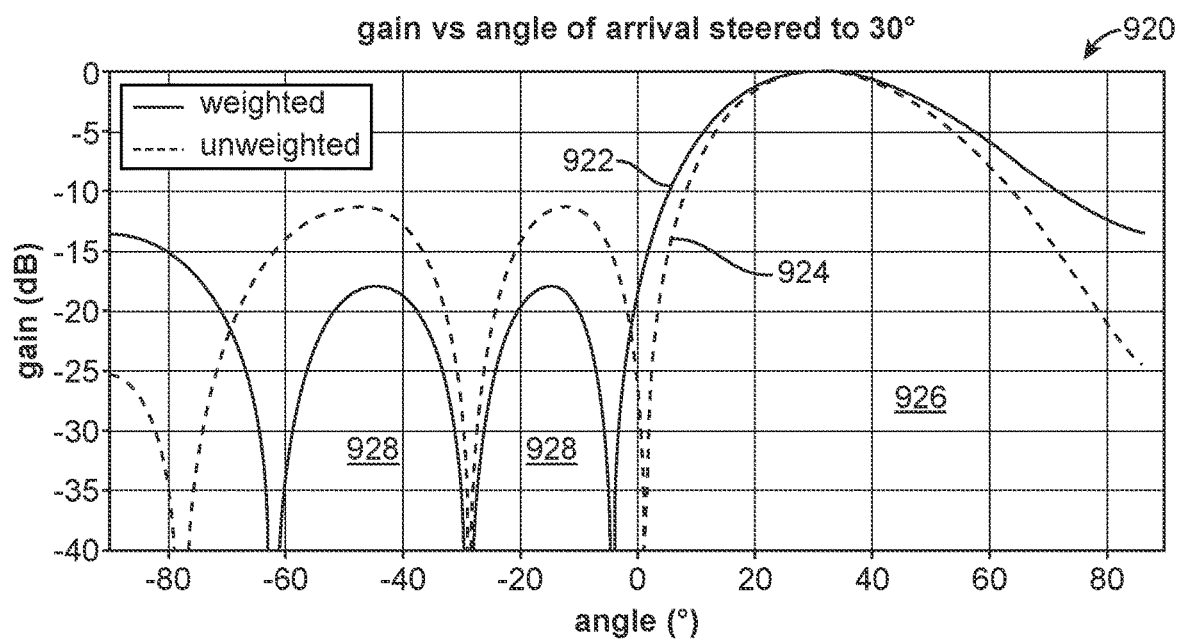
FIG. 9C illustrates gain versus angle of arrival for weighted versus unweighted signals.
Figure 9D:
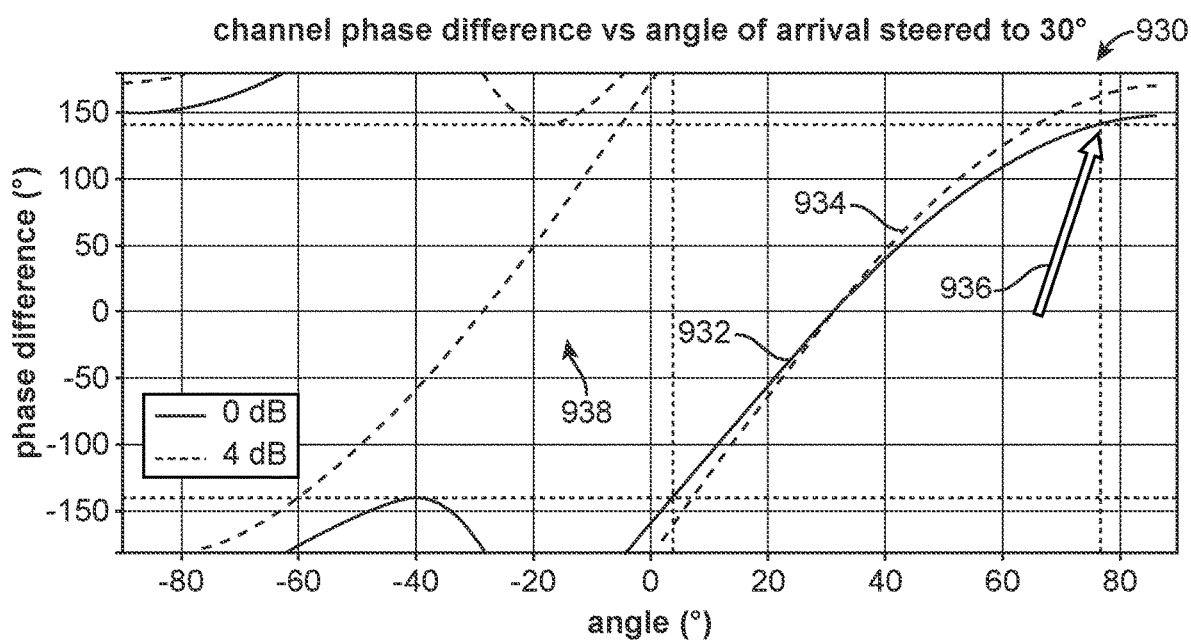
FIG. 9D illustrates channel phase difference versus angle of arrival for weighted and unweighted signals.

FIGS. 9A-9D show the phase difference versus angle of arrival for an array steered to boresight (0°) in FIG. 9B and to 30° from boresight in FIG. 9D. FIGS. 9A-9D illustrate how the angle can be unambiguously measured using the phase difference for two steering angles, zero degrees shown in FIG. 9A and FIG. 9B and 30° illustrated by FIG. 9C and FIG. 9D. An example array is divided into a 2×2 array of 4 channels, where each channel is composed of a number of weighted and steerable elements. The elements can be symmetrically weighted about horizontal and vertical lines that pass through the center of the array. In one example, the weighting is applied in both the horizontal and vertical directions. Additionally, the elements can be steered in a particular direction by applying a progressive phase shift across the elements in the array. The weighted and phase-shifted output of the elements for each channel is then combined coherently to produce the channel output for the 4 channels.

When a signal from a particular direction impinges on the array, the system measures the horizontal angle of arrival by coherently combining the left two channels, and coherently combining the right two channels, and then measures a coherent phase difference between these combined channels. The system measures the vertical angle of arrival by coherently combining the top two channels, and coherently combining the bottom two channels. The system then measures the coherent phase difference between these combined channels. The measurement of the channel phase difference versus angle of arrival is shown in FIGS. 9B and 9D.

When an equally weighed array is used, signals from the main lobe and multiple side lobes produce the same phase. This is shown by the signal 904 in the graph 900 of FIG. 9A, the signal 914 in the graph 910 of FIG. 9B, the signal 924 in the graph 920 of FIG. 9C and the signal 934 in the graph 930 FIG. 9D. However, when a suitably weighted antenna is used, the phase difference will be close to out-of-phase in the side lobes. Signal 902 in FIG. 9A represents the gain versus angle of arrival for a weighted antenna steered to 0°. Signal 922 in the graph 920 of FIG. 9C represents the gain versus angle of arrival for a weighted antenna steered to 30°. Signal 932 in the graph 930 of FIG. 9D represents the channel phase difference versus angle of arrival for a weighted antenna steered to 30°. As shown in FIG. 9D, the point 936 represents the maximum unambiguous angle for a weighted antenna. Signal 912 in graph 910 of FIG. 9B represents the channel phase difference versus angle of arrival for the weighted antenna steered to 0°. The phase difference in the main lobe will span all values from −180° to 180°. If the measured phase difference shown in FIG. 9B falls in a certain range, then the system can unambiguously determine the impinging signal's angle of arrival along the axis that is being measured. For an antenna steered to zero degrees, see FIG. 9B for the maximum unambiguous angle for the weighted antenna at point 916.

Feature 906 represents the main lobe and feature 908 represents the side lobes in FIG. 9A. Feature 926 represents the main lobe and feature 928 represents the side lobes in FIG. 9C.

Note in FIG. 9B that the unweighted phase difference 915 and 911 can represent signals which can be ambiguous with respect to the angle of arrival. For example, at a phase difference of 50°, the angle of arrival could be −60° (signal 915) or about 8° (signal 914) as shown in FIG. 9B. At a phase difference of −50°, the signal 914 could indicate that the object is at an angle of about −8° or signal 911 might indicate that it is at 60°. The signal 915 can relate to a side lobe 908 left of the main load 906 shown in FIG. 9A. The signal 911 can relate to the side lobe 908 on the right side of the main lobe 906 shown in FIG. 9A.

When weighting is used as disclosed herein, the unweighted signal 915 moves to the position shown by weighted signal 917. Signal 911 moves to the position shown by weighted signal 913. As can be appreciated, with the weighted signal, at a phase difference of 50°, the angle of arrival is shown by signal 912 as 20° and there is no alternate signal associated with side lobe region which can cause confusion. Signal 917 has shifted as well as signal 913, only leaving a single option along a certain range between approximately −140 and 140° of phase difference. This is why feature 916 represents the maximum unambiguous angle for the weighted antenna. Above that phase difference, say at 155 or 160°, the signal 917 can come into play and cause the result to be ambiguous. Therefore, in one aspect, the present disclosure addresses interpreting or reading the angle of arrival of a signal only within a range in which only a single solution is identified from the analysis.

A similar approach can also be applied to FIG. 9D in which the unweighted signal 940 shifts. Upon applying a weighting to the antenna array to result in signal 942 and signal 944. This shift causes a single result embodied in signal 932 four. A phase difference between approximately −140 and 140° as is shown in the figure. This is why feature 936 is represented as the maximum unambiguous angle for a weighted antenna array.

In one aspect, where a weighted antenna array results in multiple potential angles of arrival for a target object, the method may include repositioning the antenna array on a flying vehicle in order to position the antenna array such that the received signal is more likely to be within the proper range, which only yield a single result for the angle of arrival. In another aspect, the array can be electrically steered rather than physically moved.

A lookup table or other suitable transformation can be used to determine the angle of arrival from the measured phase difference in the unambiguous range. Measured phase differences that fall into an ambiguous region can be labeled as side lobe signals that fall outside of the central unambiguous part of the main lobe, where the angle of arrival is otherwise unknown. Regions 918 and 920 in FIG. 9B represent the ambiguous regions. Region 938 in FIG. 9D represents the ambiguous region.

Figure 9E:
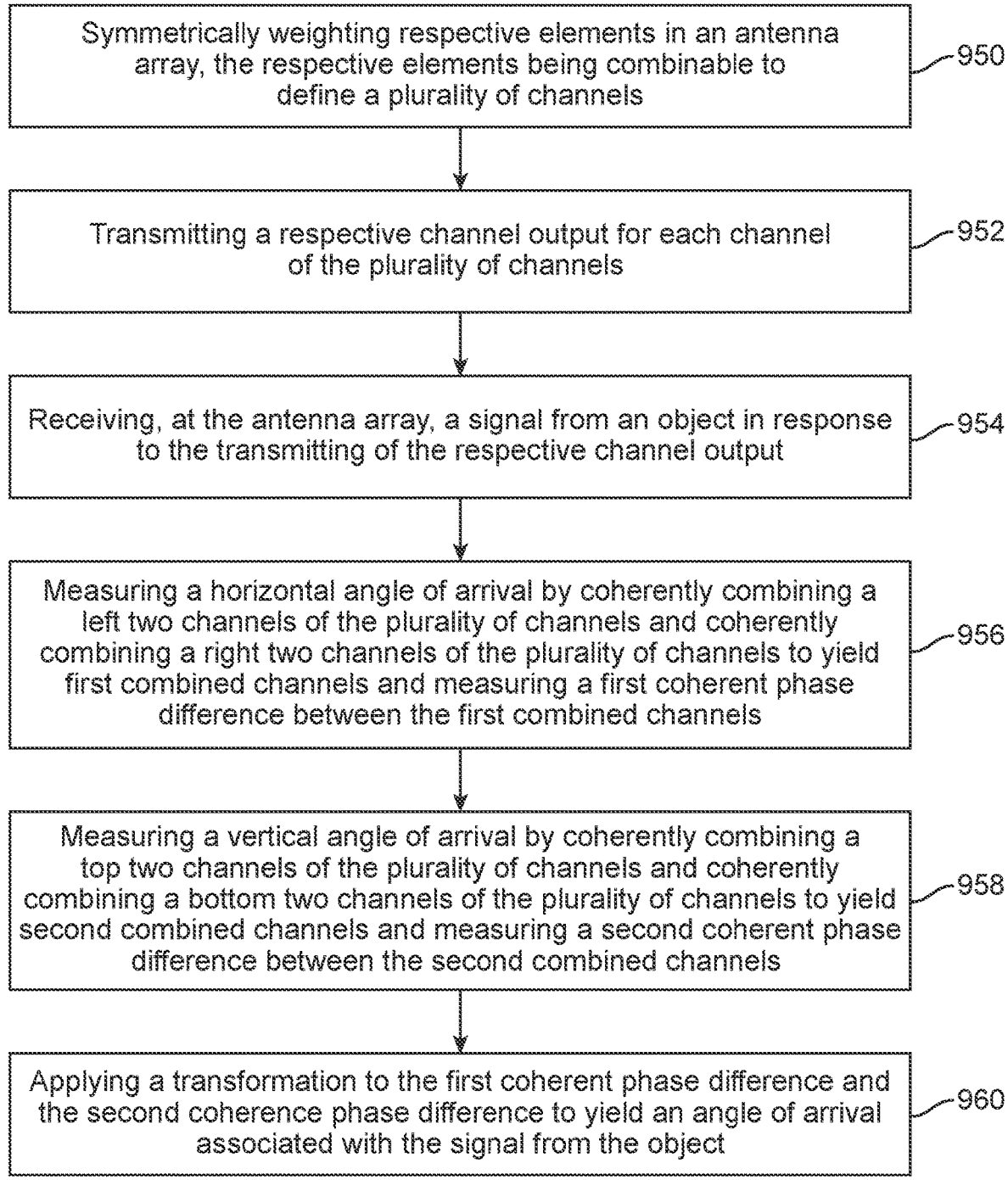
FIG. 9E illustrates an example method.

FIG. 9E illustrates a method embodiment related to the concepts described above. An example method includes symmetrically weighting respective elements in an antenna array, the respective elements being combinable to define a plurality of channels (950), transmitting a respective channel output for each channel of the plurality of channels (952), receiving, at the antenna array, a signal from an object in response to the transmitting of the respective channel output (954), measuring a horizontal angle of arrival by coherently combining a left two channels of the plurality of channels and coherently combining a right two channels of the plurality of channels to yield first combined channels and measuring a first coherent phase difference between the first combined channels (956), measuring a vertical angle of arrival by coherently combining a top two channels of the plurality of channels and coherently combining a bottom two channels of the plurality of channels to yield second combined channels and measuring a second coherent phase difference between the second combined channels (958) and applying a transformation to the first coherent phase difference and the second coherence phase difference to yield an angle of arrival associated with the signal from the object (960).

Figure 10:
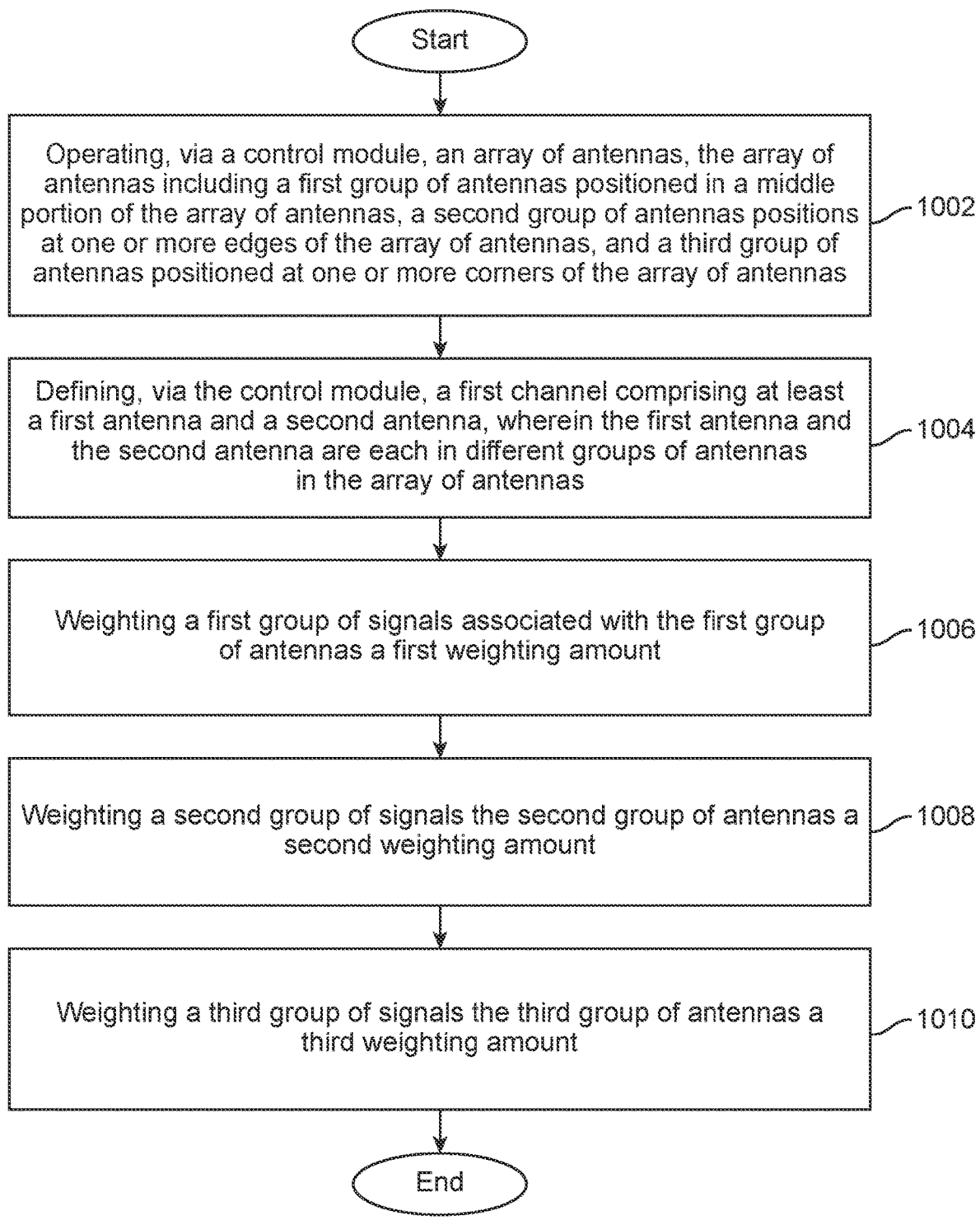
FIG. 10 illustrates another example method

FIG. 10 illustrates a method example 1000 as disclosed herein. A method includes operating, via a control module or otherwise, an array of antennas, the array of antennas including a first group of antennas positioned in a middle portion of the array of antennas, a second group of antennas positions at one or more edges of the array of antennas, and a third group of antennas positioned at one or more corners of the array of antennas (1002), defining, via the control module, a first channel comprising at least a first antenna and a second antenna, wherein the first antenna and the second antenna are each in different groups of antennas in the array of antennas (1004), weighing a first group of signals associated with the first group of antennas a first weighting amount (1006), weighting a second group of signals the second group of antennas a second weighting amount (1008) and weighting a third group of signals the third group of antennas a third weighting amount (1010). The received signals based on the weighting includes the essential elimination of side lobe potential angle of arrival signals and thus only leaves the main lobe data to determine more accurately and unambiguously what the angle of arrive is.

Other actions can also follow the features outlined in FIG. 10. For example, where an array of antennas is configured on a drone to identify an object or location of an object, the process outlined in FIG. 10 can be deployed and various weights can be applied to signals in order to arrive at an identification or classification of the object and its location. Once radar is used to determine the angle of arrival of a signal, which can then provide latitude and longitude for the object, the drone can queue a camera on the object and take yet further actions such as deploying a netting system to capture the object if it is a bad actor. In this regard, the method can include utilizing a weighting scheme in an array of antenna elements such that interior elements are weighted more than exterior elements as described herein, identifying a latitude and longitude associated with an object in the field of view of the intent array and taking an action based on the latitude and longitude associated with the object. The action can include pointing an optical based device, such as a camera, at the object, as well as performing other actions such as shooting a projectile at the object, capturing the object, deploying a net to capture the object, scrambling a signal associated with the object, reporting the object, organizing and deploying a swarm of multiple drones associated with controlling the object, and so forth.

The above approach works well for single targets and typically is designed for a small array of antennas configured on a drone. The weighting could vary for larger arrays or a larger number of channels, such as 16 channels and would also work for land-based, larger antennas arrays as well.

In some embodiments the computer-readable storage devices, mediums, and/or memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

We claim:

1. An antenna system comprising:
   a first group of antennas at a first position of an antenna array, wherein the first group of antennas is weighted a first weighting amount;
   a second group of antennas at a second position of the antenna array, wherein the second group of antennas is weighted a second weighting amount;
   a third group of antennas at a third position of the antenna array, wherein the third group of antennas is weighted a third weighting amount; and
   a first antenna and a second antenna, wherein the first antenna and the second antenna define a channel, wherein the first antenna and the second antenna are each in different groups of antennas in the antenna array, and wherein the first weighting amount, the second weighting amount and the third weighting amount are each different weighting amounts.

2. The antenna system of claim 1, wherein the first group of antennas is positioned in a middle portion of the antenna array.

3. The antenna system of claim 1, wherein the second group of antennas is positioned at one or more edges of the antenna array.

4. The antenna system of claim 1, wherein the third group of antennas is positioned at one or more corners of the antenna array.

5. The antenna system of claim 1, wherein a control module is configured to control the weighting of the antennas.

6. The antenna system of claim 1, wherein a control module is configured to control the weighting of the antennas is hard coded into each antenna.

7. The antenna system of claim 1, wherein the first group of antennas comprises between 1 and 5 antennas, wherein the second group of antennas comprises between 1 and 5 antennas and wherein the third group of antennas comprises between 1 and 4 antennas.

8. The antenna system of claim 1, wherein the antenna array comprises MxN antennas.

9. The antenna system of claim 8, wherein M=4 and N=4.

10. The antenna system of claim 1, wherein the antenna array is configured such that an overall shape of the antenna array comprises one of a square, a rectangle, a circle or an oval.

11. The antenna system of claim 10, wherein the antenna array in the overall shape of the oval comprises between 12 and 18 antennas in at least 4 rows.

12. The antenna system of claim 1, wherein the antenna array comprises a first row having three antennas, a second row having four antennas, a third row having five antennas, and a fourth row having four antennas.

13. The antenna system of claim 1, wherein the first weighting amount is greater than the second weighting amount, and wherein the second weighting amount is greater than the third weighting amount.

14. The antenna system of claim 13, wherein the first weighting amount comprises between −1 and 1 dB, the second weighting amount comprises between −6 and −4 dB in the third weighting amount comprises between −9 and −11 dB.

15. A method comprising:
    operating, via a control module, an array of antennas, the array of antennas comprising a first group of antennas at a first position, a second group of antennas positions at a second position, and a third group of antennas positioned at a third position;
    defining a channel comprising at least a first antenna and a second antenna, wherein the first antenna and the second antenna are each in different groups of antennas in the array of antennas;
    weighting a first group of signals associated with the first group of antennas a first amount;
    weighting a second group of signals associated with the second group of antennas a second amount; and
    weighting a third group of signals associated with the third group of antennas a third amount, wherein the first amount, the second amount and the third amount are each different weighting amounts.

16. The method of claim 15, further comprising, one or more of: wherein the first amount comprises between −1 and 1 dB, wherein the second amount comprises between −4 and −6 dB and wherein the third amount comprises between −9 and −11 dB.

17. The method of claim 15, wherein the weighting of the first group of signals, the weighting of the second group of signals and the weighting of the third group of signal is controlled by the control module.

18. The method of claim 15, wherein the weighting of the first group of signals, the weighting of the second group of signals and the weighting of the third group of signals are applied in both a horizontal direction and a vertical direction.

19. The method of claim 15, wherein the first amount is greater than the second amount, and wherein the second amount is greater than the third amount.

20. The method of claim 15, wherein the array of radar antennas is configured such that an overall shape of the array of radar antennas comprises one of a square, a rectangle, a circle or an oval.

* * * * *